Patented Sept. 11, 1923.

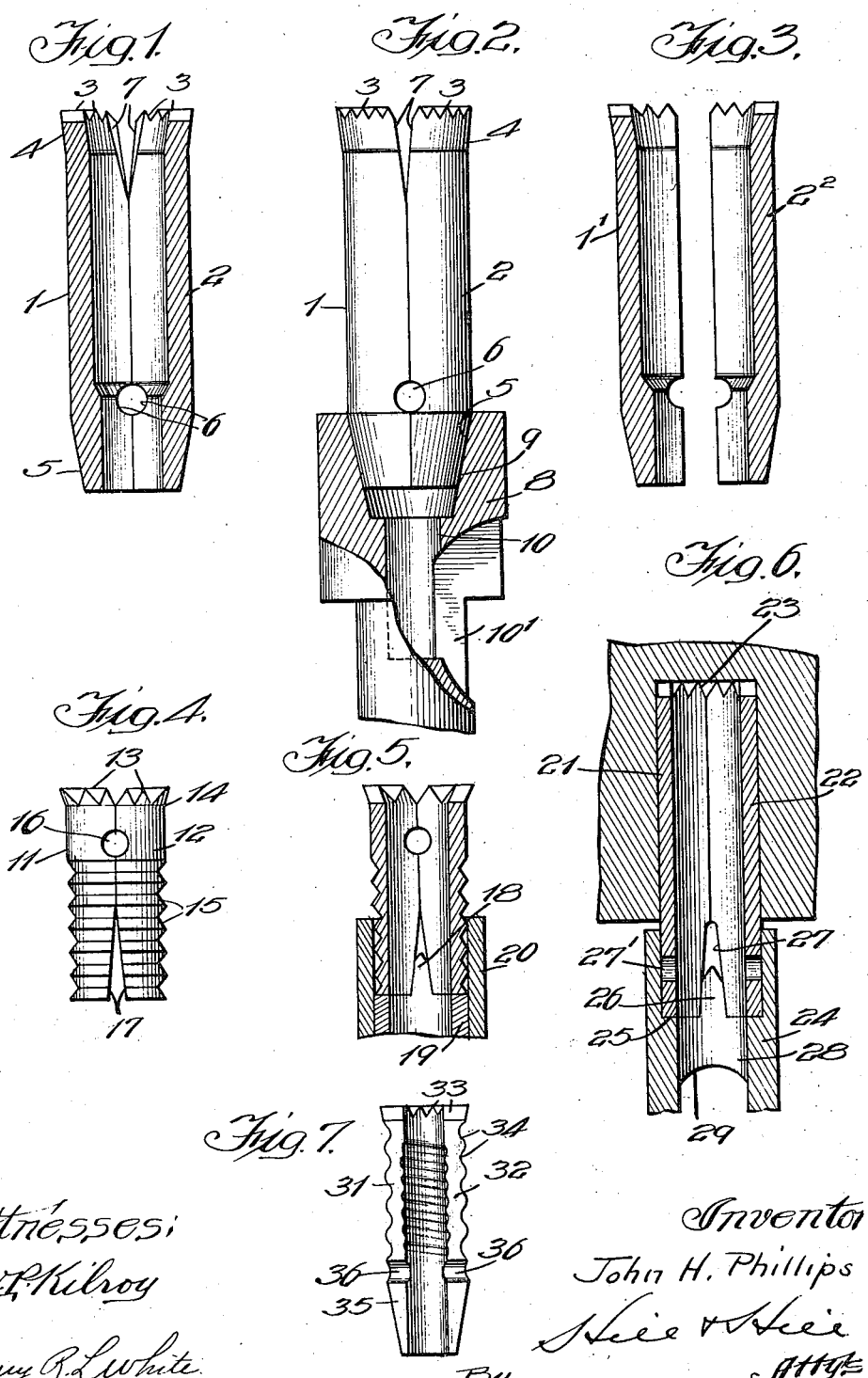

1,467,451

UNITED STATES PATENT OFFICE.

JOHN H. PHILLIPS, OF CHICAGO, ILLINOIS.

TUBULAR DRILL.

Original application filed July 21, 1919, Serial No. 312,243. Divided and this application filed November 22, 1919. Serial No. 340,028.

*To all whom it may concern:*

Be it known that I, JOHN H. PHILLIPS, a citizen of the United States, residing at Chicago, in the county of Cook and State of Illinois, have invented certain new and useful Improvements in Tubular Drills, of which the following is a description.

My invention belongs to that general class of devices known as stone drills or the like and relates particularly to a tubular, hollow, shell or core type of drill for drilling holes in concrete, brick, stone or like material. The drill, when constructed in two or more parts, may also be utilized as an anchor or expansion shell for fastening and holding various devices and mechanisms to said material. This, however, is more fully set forth in my pending application, Serial No. 312,243, filed July 21, 1919, this being a divisional application thereof. My invention has among its objects the production of a drill of the kind described, that is simple, convenient, efficient, durable, responsive and suitable for use wherever found applicable. More especially it has among its objects the production of a drill which will be rapid in operation and drill a clean cut hole in which the drill itsef or equivalent shell parts may thereafter be inserted for anchoring purposes. Many other objects and advantages of the construction herein shown and described will be obvious to those skilled in the art, from the disclosure herein made.

To this end my invention consists of the novel construction, arrangement and combination of parts herein shown and described and more particularly pointed out in the claims.

In the drawings, wherein like reference characters indicate like or corresponding parts, Figure 1 is a sectional view through a two part drill, Figure 2 is a view in elevation of the same, seated in a chuck, shown in section, Figure 3 is a sectional view of a slightly modified form of drill, the parts being separated, Figure 4 is a view in elevation of a slightly different construction, Figure 5 is a sectional view through the same seated in the chuck, only a portion of the chuck being shown, Figure 6 is a sectional view illustrating another form of the drill, a portion of the chuck being shown, and Figure 7 is a sectional view of still another form of the drill.

Referring to the drawings, it may be mentioned that the drill proper may be constructed in one or more parts, preferably in two or more. By constructing the same in two or more parts, the same may be economically manufactured and in many cases the same may be made of cheap material and case hardened. In this case the same may be punched from a bar and after forming in a press the same may be case hardened, which means rapid production and low cost enabling a cheaper drill to be produced. In the construction of the device shown in Figure 1, the drill consists of two parts which are provided with cutting teeth or edges 3 at one end, the cutting end being preferably slightly larger for clearance as at 4. The parts are made of suitable material in the preferred way and of the desired size. The end opposite the cutting edges is arranged to engage in the suitable chuck. As shown, the same is tapered as at 5—5 and I prefer to provide holes or notches 6 in each drill part which register when the two drill parts are together forming holes. This form of the device is also preferably cut away as at 7 so as to form incline faces on the two parts. As shown in Figure 2, 8 represents the head of a suitable chuck or holder provided with a shank of the desired size. The head is recessed as at 9 so as to receive and fit the tapered end 5—5 of the drill. The same is also provided with a tubular bore 10 having an opening 10' at the base through which the drillings may escape, so that the same do not clog up the drill or require the drill to be removed for cleaning. The chuck may be operated in any suitable manner, not necessary to describe herein, the same being substantially of the type known as the reciprocating or percussion chuck which may be operated by a spring, compressed air, electric, hand or other suitable type of hammer. The number of holes which may be drilled with this drill will vary according to the material from which it is made and the method of making and according to the material to be drilled. One of the advantages of this shell or core type of drill which may be mentioned here over other types of fluted or flat type drills commonly used, is that practically 50% of the material removed in drilling is in the form of a core which breaks off in short pieces as the drill progresses. With the fluted or flat drill all material removed must be crushed or pulverized, requiring much more work in drilling. Cutting away a portion to provide the faces 7—7 provides a clearance space so that the drillings may escape from the end into the tubular bore. The same also serves as faces for the expanding mechanism when the same is used as a shell. In case the parts wedge in the chuck tightly, the insertion of a tool in holes 6 easily loosens the same for removal from the chuck.

The construction shown in Figure 3 is substantially similar, except that the parts are not cut away to provide the faces 7—7. Figures 4 and 5 show what may be termed a straight end or flush type of drill slightly modified in construction but embodying the salient points of the drill previously described. Referring to the figures, this type is shown consisting of the two parts 11 and 12 formed with the cutting edges or faces 13 and slightly flared as at 14. The drill parts are also shown with corrugations or ribs, so as to provide a fluted exterior as at 15. In this case holes 16 arranged adjacent the opposite end and the incline faces 17 are arranged at the end of the drill opposite the cutting edges. The chuck consists of a tubular part 19 which may be formed with the projecting parts 18, 20 being an adjustable retaining collar which maintains the chuck in place, but which may be used so that the drill may drill in flush with the end of the chuck 19.

In the type of drill shown in Figure 6, the same may also be of one or more parts. As shown, it consists of two parts 21 and 22 formed with the cutters 23 at one end, the same being arranged at the opposite end with holes 27' and adapted to seat on the shoulder 25 formed in the chuck 24. The chuck 24 is shown with the projecting lugs 26 arranged to fit in the cut away portion 27 and with the holes 27'. In this case the chuck is also tubular as indicated at 28 and provided with an opening 29 at one side through which the drillings will be discharged. In the drill shown in Figure 7, 31 and 32 represent the two parts formed with the cutting end 33 and with ribs or corrugations 34. This type of drill also has a flared or tapered end 35 and holes 36.

Where the device is to be used only for drilling, the same need only be made in one part, but where it is to be thereafter used as an expansion shell, or part thereof, as described in my application referred to, of which this is a divisional application, the same is preferably made in one part and slotted, or of two or more parts. Making the same of two or more parts also enables a cheaper drill to be constructed which is suitable for many uses. In case one part of the drill wears more than the other, it is also possible to remove one-half and use the portion that is still fit for further service. In some cases the drill may be cheaply constructed in one part, by forming a sheet and rolling it up to produce the tubular shell, afterwards hardening or tempering the same as previously mentioned. Where I use the words teeth, or cutting teeth, in the specification or claims, I wish to be understood as meaning any style of cutting edges, faces or the equivalent.

Having thus described my invention, it is obvious that various immaterial modifications may be made in the same without departing from the spirit of my invention, hence I do not wish to be understood as limiting myself to the exact construction, arrangement, combination of parts or uses mentioned.

What I claim as new and desire to secure by Letters Patent is:

1. A drill consisting of a tubular shell provided with cutting teeth at one end and constructed with a taper at the opposite end, terminating at a point intermediate the shell ends, said tapered end having an opening through the walls thereof.

2. A percussion drill comprising a plurality of similarly formed parts arranged together to provide a tubular shell, the parts at one extreme end of the shell formed with cutting teeth about the edge, said parts being cut away at their juncture adjacent said toothed end and inwardly beyond said teeth to provide a substantially V-shaped recess extending inwardly beyond the base line of said teeth, whereby when the drill is operated the drillings will pass through the bore of the tubular shell.

3. A percussion drill comprising a plurality of similarly formed parts arranged together to provide a tubular shell, the parts at one extreme end of the shell formed with cutting teeth about the edge, said parts being cut away at their juncture adjacent said toothed end and extending inwardly beyond the base line of the teeth to provide a substantially V-shaped recess whose side walls are mutually convergent from their inner to their outer peripheries, whereby when the drill is operated the drillings will pass through the bore of the tubular shell.

4. A tubular drill comprising a plurality of similarly formed parts arranged together to form a shell, said parts at one end of the shell enlarged and provided with teeth at the extreme end of the parts, and the opposite end tapered to engage a cooperating chuck, said parts formed with an opening therethrough adjacent said tapered end.

5. A tubular drill comprising a plurality of similarly formed parts arranged together to form a shell, said parts at one end of the shell enlarged and provided with teeth about the edge, said parts being cut away at said toothed end to provide a substantially V-shaped recess therein, and the opposite end of the shell parts being tapered to engage a cooperating chuck, said parts formed with an opening therethrough adjacent said tapered end.

6. A tubular drill comprising a plurality of similarly formed parts arranged together to form a shell, said parts at one end of the shell being enlarged and provided with teeth about the edge, and the opposite end tapered to engage a cooperating chuck, said parts being cut away at said toothed end to provide a substantially V-shaped recess therein whose side walls are mutually convergent from their inner to their outer peripheries, said parts being formed with an opening therethrough adjacent said tapered end.

In testimony whereof, I have hereunto signed my name in the presence of two subscribing witnesses.

JOHN H. PHILLIPS.

Witnesses:
   Roy W. Hill,
   Bernice Delaney.